(12) United States Patent
Hurley et al.

(10) Patent No.: US 8,213,447 B2
(45) Date of Patent: Jul. 3, 2012

(54) APPARATUS AND SYSTEM FOR COUPLING AND DECOUPLING INITIATOR DEVICES TO A NETWORK USING AN ARBITRATED LOOP WITHOUT DISRUPTING THE NETWORK

(75) Inventors: Kean P. Hurley, Aptos, CA (US); Bhavi Saklecha, Fremont, CA (US); Alfonso Y. Ip, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/877,623

(22) Filed: Sep. 8, 2010

(65) Prior Publication Data

US 2010/0329151 A1  Dec. 30, 2010

Related U.S. Application Data

(63) Continuation of application No. 11/179,732, filed on Jul. 13, 2005, now Pat. No. 7,796,627.

(60) Provisional application No. 60/600,836, filed on Aug. 12, 2004.

(51) Int. Cl.
*H04L 12/28* (2006.01)
(52) U.S. Cl. ............... 370/419; 370/357; 370/400
(58) Field of Classification Search .............. None
See application file for complete search history.

(56) References Cited

U.S. PATENT DOCUMENTS

| | | | |
|---|---|---|---|
| 6,118,776 A | 9/2000 | Berman | |
| 6,606,322 B2 | 8/2003 | Mitchem et al. | |
| 2003/0043816 A1 | 3/2003 | Mitchem et al. | |
| 2003/0076788 A1 | 4/2003 | Grabauskas et al. | |
| 2003/0086377 A1 | 5/2003 | Berman | |
| 2003/0095549 A1 | 5/2003 | Berman | |
| 2003/0188059 A1 | 10/2003 | Zack | |
| 2004/0081186 A1 | 4/2004 | Warren et al. | |
| 2004/0081187 A1 | 4/2004 | Warren et al. | |
| 2004/0085972 A1 | 5/2004 | Warren et al. | |
| 2004/0085994 A1 | 5/2004 | Warren et al. | |
| 2005/0018672 A1 | 1/2005 | Dropps et al. | |
| 2005/0076113 A1* | 4/2005 | Klotz et al. | 709/224 |
| 2006/0034192 A1 | 2/2006 | Hurley et al. | |
| 2006/0092932 A1 | 5/2006 | Ghosh et al. | |

OTHER PUBLICATIONS

"Cisco MDS 9000 Family Fabric Manager User's Guide", Cisco Systems, Inc., San Jose, CA, Release 1.2(1a), Sep. 2003, 149 pages.

* cited by examiner

*Primary Examiner* — Bob Phunkulh
(74) *Attorney, Agent, or Firm* — Sterne, Kessler, Goldstein & Fox PLLC

(57) ABSTRACT

The present invention enables the coupling and decoupling of multiple processing devices to a network without disrupting the network. In an embodiment, the invention provides a switch having a network port and several initiator ports each configured for coupling to a processing device. The switch is configured to route data from the network port to the initiator ports and from the initiator ports to the network port. A management agent facilitates operation of the switch by processing port initializations, replying to device registration requests, and processing predetermined unsolicited discovery commands. During operation, the management agent enables configuration changes caused, for example, by the coupling and/or decoupling of processing device to initiator ports.

21 Claims, 8 Drawing Sheets ion enables the coupling and decoupling of multiple processing devices to a network without disrupting the network. In an embodiment, the invention provides a switch having a network port and several initiator ports each configured for coupling to a processing device. The switch is configured to route data from the network port to the initiator ports and from the initiator ports to the network port. A management agent facilitates operation of the switch by processing port initializations, replying to device registration requests, and processing predetermined unsolicited discovery commands. During operation, the management agent enables configuration changes caused, for example, by the coupling and/or decoupling of processing device to initiator ports. It is a feature of the present invention that the number of configuration changes seen by the network are minimal.

APPARATUS AND SYSTEM FOR COUPLING AND DECOUPLING INITIATOR DEVICES TO A NETWORK USING AN ARBITRATED LOOP WITHOUT DISRUPTING THE NETWORK

CROSS REFERENCE TO RELATED APPLICATION

This application is a continuation of U.S. application Ser. No. 11/179,732, filed Jul. 13, 2005, now allowed, titled "Apparatus and System for Coupling and Decoupling Initiator Devices to a Network Using an Arbitrated Loop Without Disrupting the Network", which claims the benefit of U.S. Provisional Patent Application No. 60/600,836, filed Aug. 12, 2004, both of which are incorporated herein by reference in their entirety.

FIELD OF THE INVENTION

The present invention generally relates to a network of devices. More particularly, it relates to an apparatus and system for coupling and decoupling data storage initiator devices to a network without disrupting the network.

BACKGROUND OF THE INVENTION

The data storage market includes a number of vendors and products. Unfortunately, integrating various products from different vendors is difficult, and it requires a substantial investment due to a lack of interoperability standards.

In one instance, in order to increase system performance and lower costs, the manufacturers of blade servers and other storage devices are considering integrating a Fibre Channel fabric switch into their devices. However, a blade server with an integrated fabric switch is likely to have difficulties communicating to an external network because of incompatibilities and proprietary features. The conventional wisdom is that such devices are connected using a Fibre Channel E-Port or B-Port topology, thereby allowing fabric related information to be communicated. But, support for standard E-Port or B-Port topology can cause many currently available Fibre Channel fabric switches to be reconfigured to a mode in which proprietary features are turned off and functions are disabled, resulting in a disruption of the network. It is also likely to create network management problems.

What is needed are new ways for integrating products from different venders to an existing network that overcome the deficiencies noted above.

BRIEF SUMMARY OF THE INVENTION

The present invention enables the coupling and decoupling of multiple processing devices to a network without disrupting the network. In an embodiment, the invention provides a switch having a network port and several initiator ports each configured for coupling to a processing device. The switch is configured to route data from the network port to the initiator ports and from the initiator ports to the network port. A management agent facilitates operation of the switch by processing port initializations, replying to device registration requests, and processing predetermined unsolicited discovery commands. During operation, the management agent enables configuration changes caused, for example, by the coupling and/or decoupling of processing device to initiator ports. It is a feature of the present invention that the number of configuration changes seen by the network are minimal.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

The present invention enables the coupling and decoupling multiple processing devices to a network without disrupting the network. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
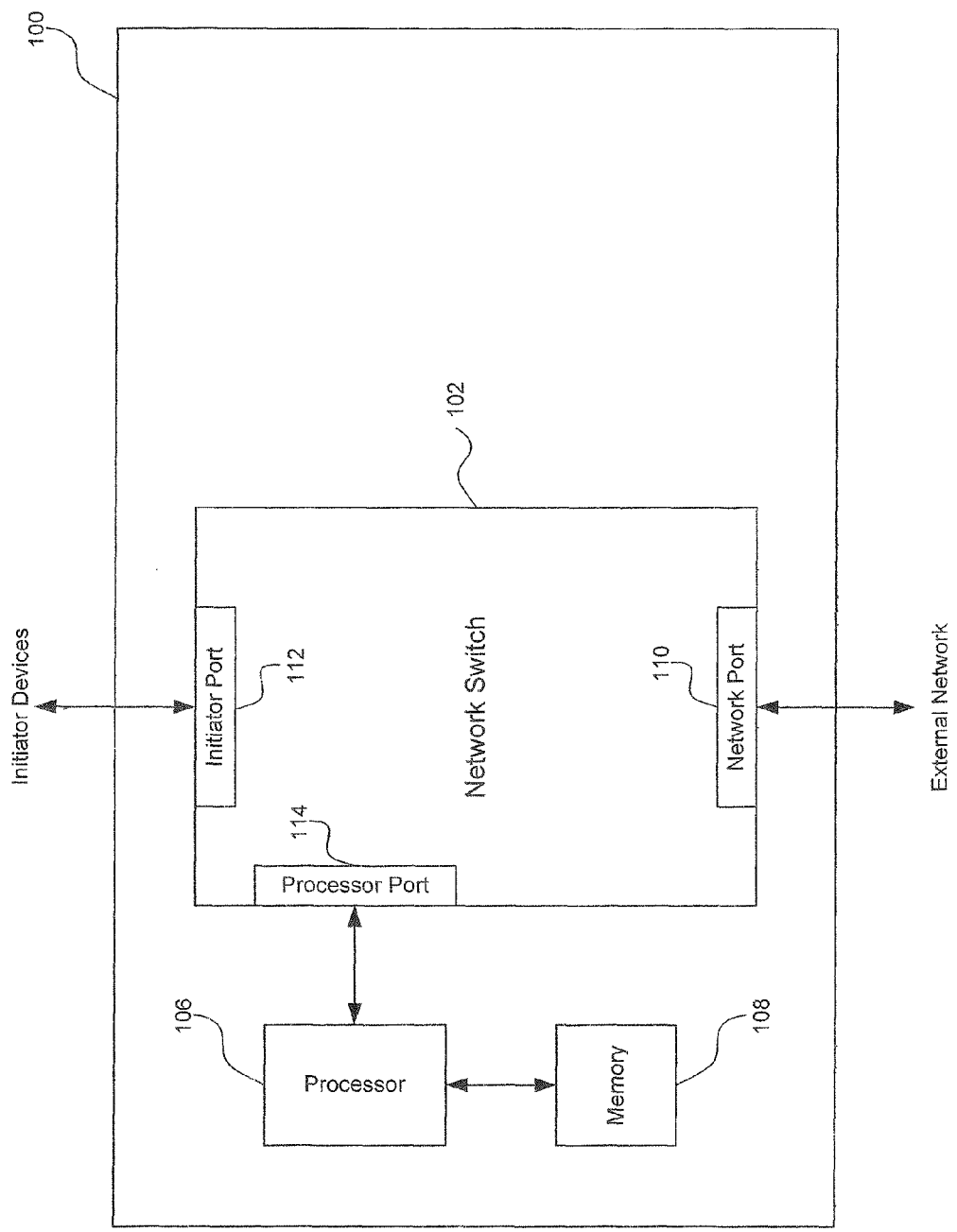
FIG. 1 is a schematic diagram of an example apparatus for coupling and decoupling multiple processing devices to a network according to an embodiment of the invention.

FIG. 1 illustrates an example apparatus 100 for coupling and decoupling multiple processing or initiator devices to a network according to an embodiment of the invention. Apparatus 100 includes a network switch 102, a processor 106, and memory 108.

Network switch 102 includes a network port 110, an initiator port 112, and a processor port 114. Network port 110 is configured for coupling to an external network. Initiator port 112 is configured for coupling to multiple processing or initiator devices such as, for example, server blades. Processor port 114 couples network switch 102 to processor 106.

In an embodiment, apparatus 100 operates in a loop topology mode referred to herein as NL_PORT mode. In this mode, apparatus 100 connects to an external network such as, for example, a Fibre Channel fabric via network port 110 such that network port 110 operates as an NL_PORT as defined in the Fibre Channel standards. As will be understood by persons skilled in the relevant art(s), an NL_PORT is a specialized loop port topology optimized to pass data traffic efficiently to a connected FL_PORT on a fabric switch. More details about this mode of operation are provided below.

It is a feature of apparatus 100 that selected portions can be formed using commercially available hardware. For example, in an embodiment, network switch 102 is a commercially available network switch such as, for example, Broadcom Corporation's BCM8440 Fibre Channel fabric switch, available from Broadcom Corporation, Irvine Calif. Processor 106 can be formed using a MIPS processing core available from MIPS Technologies, Inc., Mountain View Calif.

Figure 2:
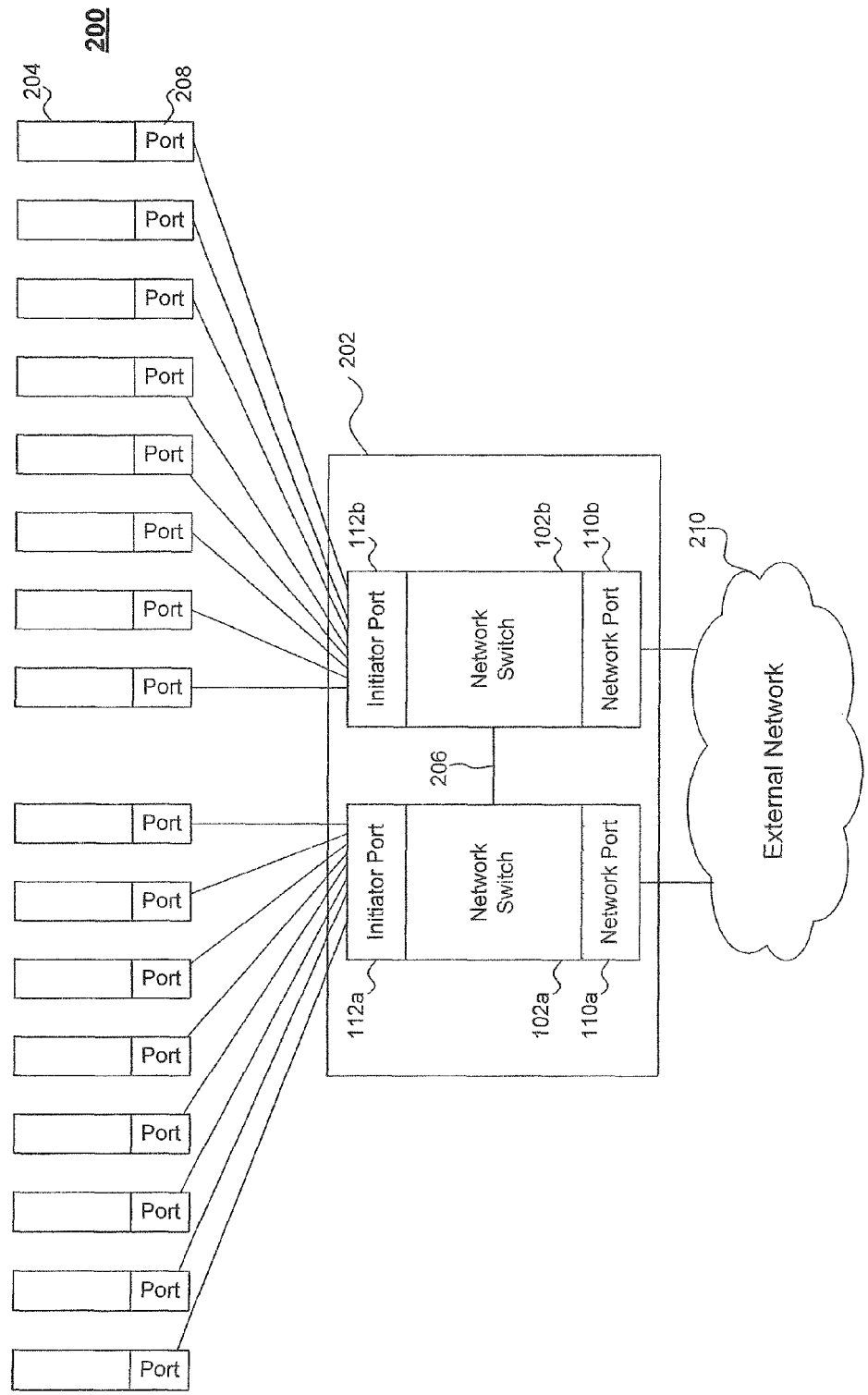
FIG. 2 is a schematic diagram of an example system according to an embodiment of the invention.

FIG. 2 illustrates an example system 200 according to an embodiment of the invention. System 200 includes an aggregator circuit 202 and a plurality of initiator devices 204. Aggregator circuit 202 couples initiator devices 204 to an external network 210.

As shown in FIG. 2, aggregator circuit 202 includes two network switches 102a and 102b. Network switches 102a and 102b each have a network port 110 and an initiator port 112. In an embodiment, each network switch 102 operates in NL_PORT mode and each network port 110 operates as an NL_PORT as defined in the Fibre Channel standards. In an embodiment, network switches 102a and 102b are coupled to one another by an inter-switch communications link 206.

Initiator devices 204 each have a port 208. Port 208 is used to couple an initiator device 204 to an initiator port 112 of a network switch 102. In an embodiment, initiator devices 204 are Fibre Channel Protocol-Small Computer System Interface (FCP-SCSI) initiator devices, and initiator port 112 includes a plurality of FC-FS2 point-to-point ports for connecting to FCP-SCSI initiator devices.

As noted above, in embodiments of the present invention, network switches 102 of apparatus 100 and system 200 are fabric switches, which operate in an NL_PORT mode. This is a specialized Fibre Channel switch architecture mode, in which the network ports 110 operate as FC-AL2 loop ports (referred to herein as NL_PORTs), configured for coupling to an external network, and the initiator ports 112 operate as FC-FS2 point-to-point ports (referred to herein as N-ph_PORTs), configured to couple to FCP-SCSI initiator devices. The network ports 110 and the initiator ports 112 are coupled together through a buffered non-blocking switch backplane.

In NL_PORT mode, input/output (I/O) frame traffic from an initiator device 204 is routed through its associated initiator port 112 of network switch 102 to network port 110. Network port 110 routes ingress frames through initiator port 112 to an appropriate initiator device 204 based on the arbitrated loop physical address (ALPA) component of a domain identification number (D_ID).

Figure 3:
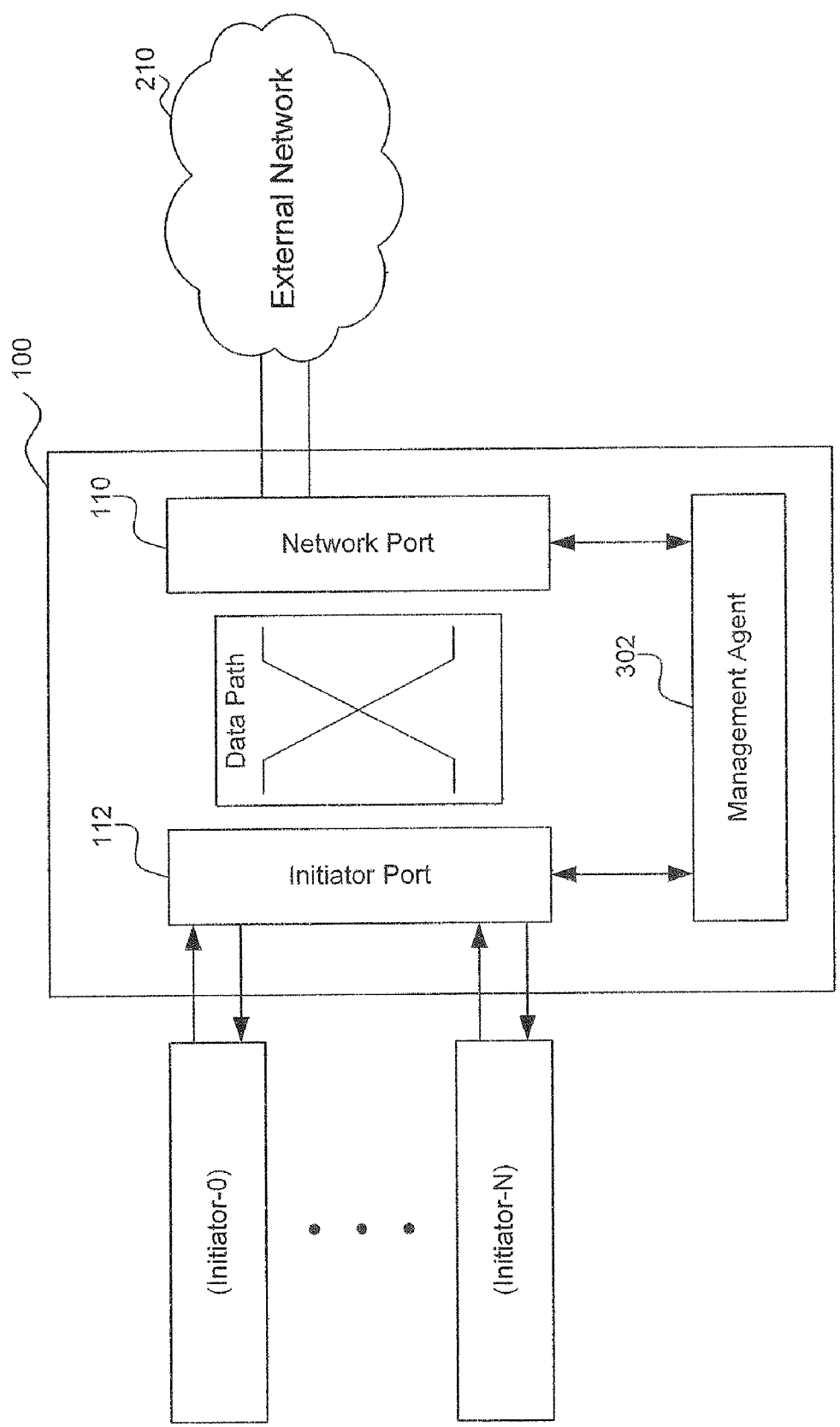
FIG. 3 is a schematic diagram that illustrates routing of management frame traffic according to an embodiment of the invention.

As illustrated by FIG. 3, all management frame traffic (e.g., port initializations, logins, and extended link services) in an apparatus such as apparatus 100, when operating in NL_PORT mode, is forwarded to an internal management agent 302 for processing. In an embodiment, internal management agent 302 is a software based management agent that is responsible for processing port events and management frame traffic for both network port 110 and initiator port 112. Additional details regarding management agent 302 are provided below.

Figure 4:
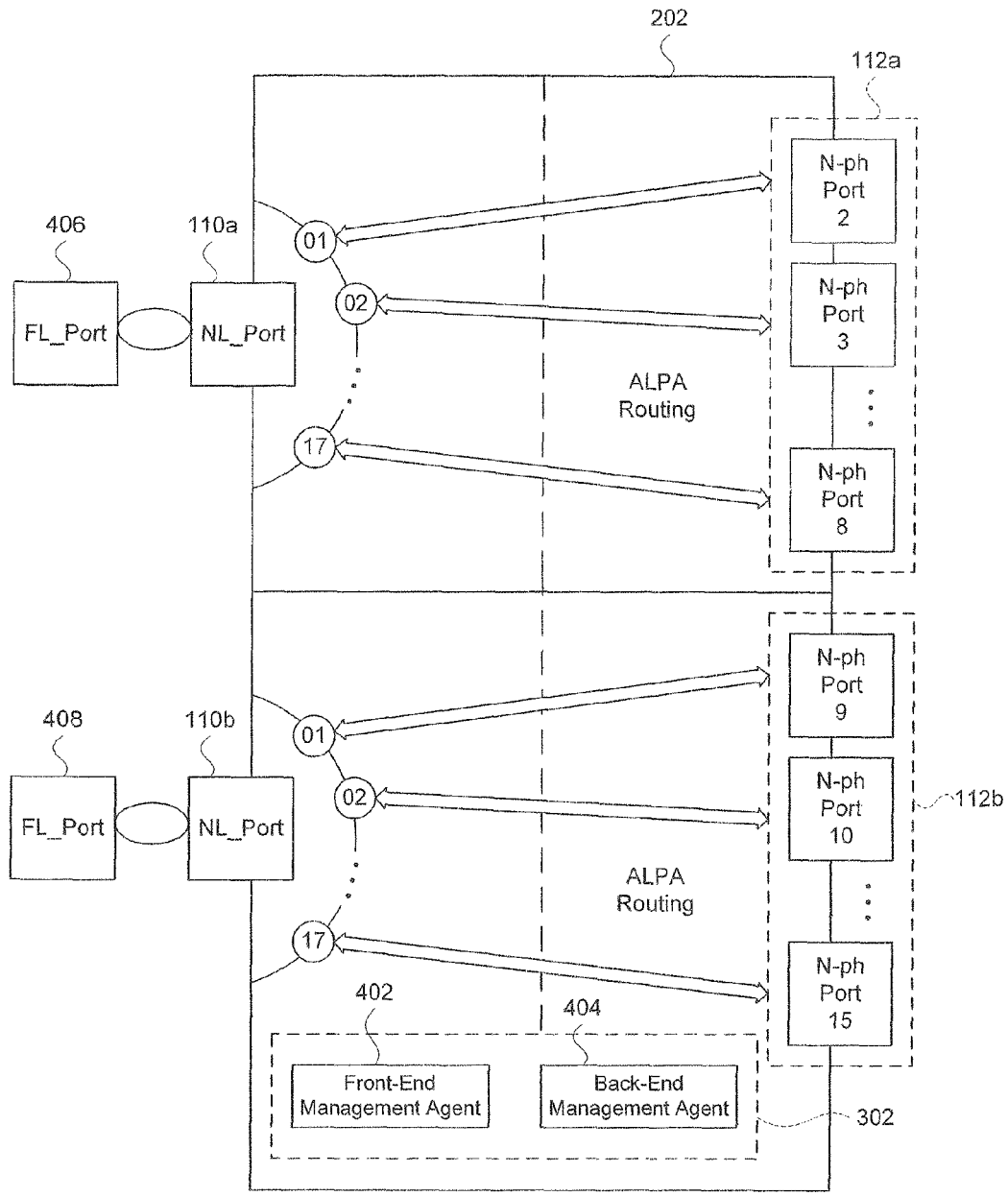
FIG. 4 is a schematic diagram that illustrates operation of a management agent and ALPA routing according to an embodiment of the invention.

As illustrated by FIG. 4, in embodiments of the present invention, with respect to network port 110, management agent's 302 processing behavior represents a fixed set of FCP-SCSI initiator devices (e.g., coupled to the N-ph PORTs) that are mapped to loop ALPA identification numbers. With respect to initiator port 112, management agent's 302 processing behavior gives each initiator device coupled to initiator port 112 the idea that it is directly coupled to a fabric switch.

As shown in FIG. 4, in an embodiment, management agent 302 is separated into a front-end management agent 402 and a back-end management agent 404. During initialization processing and address assignments, front-end management agent 402 maps a fixed number of ALPAs presented by network ports 110a and 110b to N-ph PORTs of initiator ports 112a and 112b. Front-end management agent 402 also conducts a fabric login (FLOGI) for each ALPA. A fixed World Wide Port Name (WWPN)/World Wide Node Name (WWNN) is presented for each ALPA, and the WWPN/WWNN remains constant for all initiator devices coupled to an associated N-ph PORT. During initialization processing and address assignments, each N-ph PORT initializes asynchronously sometime after its associated NL_PORT is finished initializing. Back-end management agent 404 processes FLOGI frames and returns an appropriate port identifier assigned during initialization. WWPN/WWNN filtering is performed by back-end management agent 404 on any management frame forwarded to an external network through network port 110a or 110b. A fixed WWPN/WWNN is used for each ALPA/port.

In embodiments, an NL_PORT is configured to act as a tunnel port. As used herein, a tunnel port is a specialized loop port that is optimized to pass data traffic efficiently to a connected FL_PORT on a fabric switch.

The two network ports 110a and 110b of FIG. 4 are tunnel ports, which connect to FL_PORTs 406 and 408 of an external network or fabric using a loop protocol. The N-ph_PORTs of initiator ports 112a and 112b connect to an initiator, for example, on server blades as N_PORTs, as defined by Fibre Channel standards. The initiator devices coupled to the N-ph_ PORT are exposed to the external network or fabric as loop entities on network ports 110a and 110b. The fact that the initiator devices are actually N_PORT devices connected through a buffered switching design is completely hidden from the external network or fabric.

The loop protocol noted above is preferably optimized for performance. This is possible because the network ports 110a and 110b are not really directly connect to the N_PORT initiator devices. Instead, they are tunneling ports allowing interconnection to the N_PORT initiator devices. Local frame buffers associated with each of the network ports 110a and 110b allow loop protocol interaction, which is isolated to the network ports 110a and 110b.

One notable feature of a tunnel port (e.g., network port 110) according to the present invention is egress tenancy tunneling. In egress tenancy tunneling, network port 110 sends frames from all initiator devices coupled to initiator port 112 within any tenancy established with a connected FL_PORT device. An FL_PORT allows up to 126 devices to be connected per port, wherein each device ID has a common Fabric Domain/Area identification number and a unique ALPA identification number. This is especially well suited when there are only a small number of connected devices. Additionally, loop protocol is well supported by major fabric switch vendors.

Figure 5:
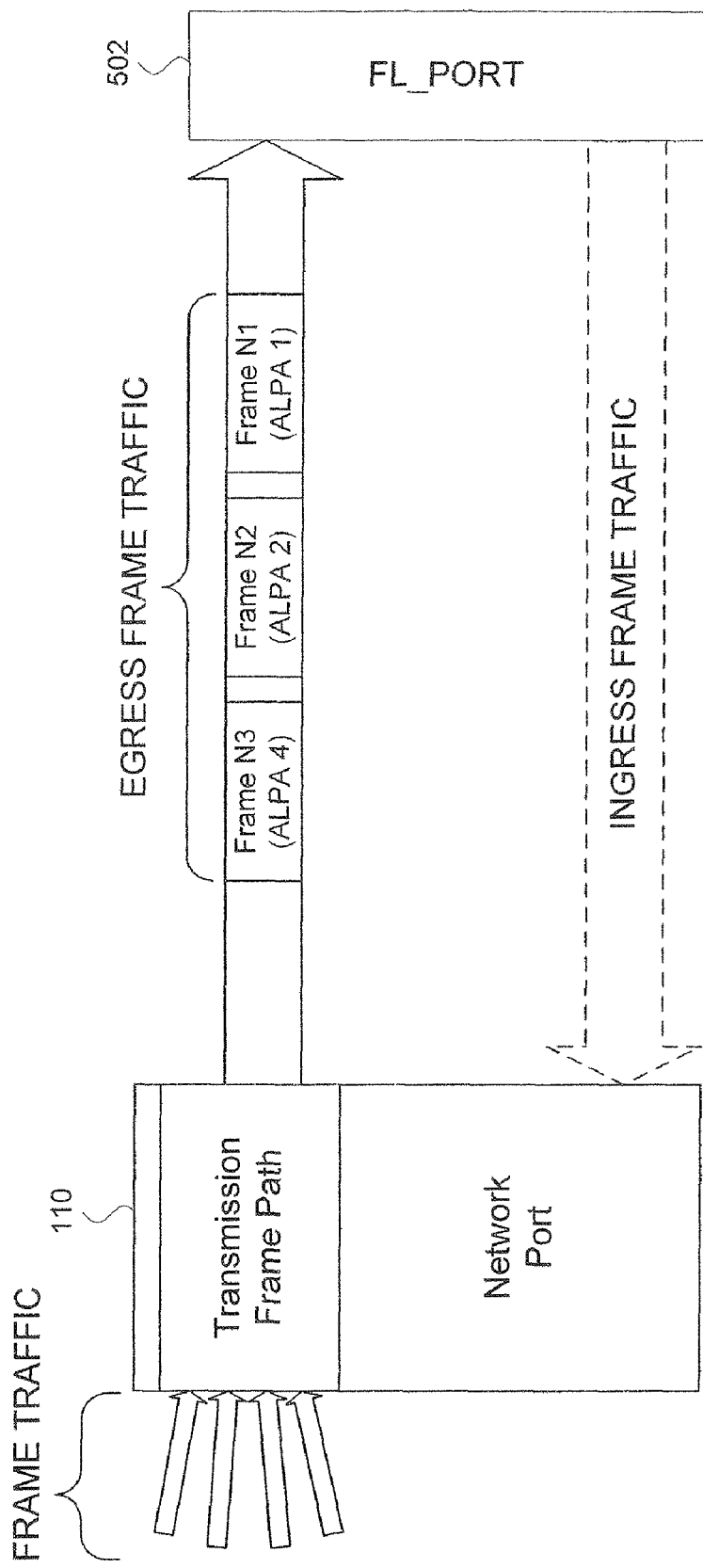
FIG. 5 is a schematic diagram that illustrates processing of frame traffic by a network port according to an embodiment of the invention.

FIG. 5 illustrates that the tenancy of network port 110 is not restricted to sending only frames from the ALPS that sent the first frame to an FL_PORT 502. Once network port 110 is operating (e.g., in an OPN or OPND (full duplex) state), it sends all egress frames so long as credit is available.

In embodiments, network switch 102 is programmed so that it performs destination port routing based on the D_ID of each frame independently, and the routing is not in any way related to the ALPS of the initial tenancy. The source identifier (S_ID) of frames passing through network port 110 may be from different ALPAs.

Another feature of the present invention is the frame routing behavior for its different port types. Each frame is independently routed based on the frame header D_ID.

Figure 6:
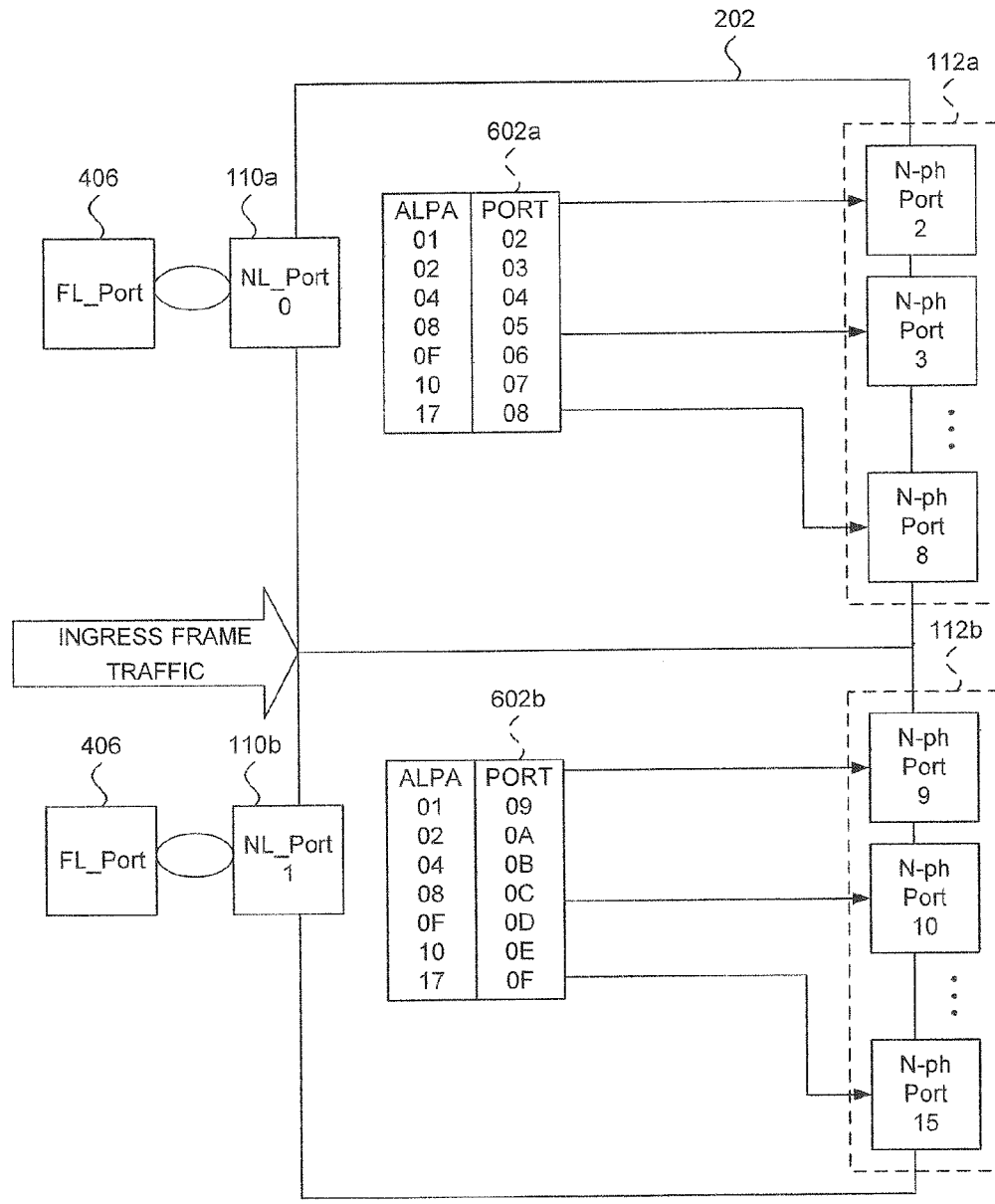
FIG. 6 is a schematic diagram that illustrates routing of ingress frame traffic according to an embodiment of the invention.

As illustrated in FIG. 6, a tunnel port (NL_PORT) such as network port 110a or 110b is configured to route by the ALPA component of the D_ID. When enabled to route by the ALPA component, the domain and area fields of the D_ID are not used in the routing decision. Instead, a routing table 602 is set up to provide routing information for valid ALPAs. Frames for invalid ALPAs are routed to CPU 106 (see FIG. 1). All ELS and Fabric service frames are sent to management agent 302 (see FIG. 3).

Figure 7:
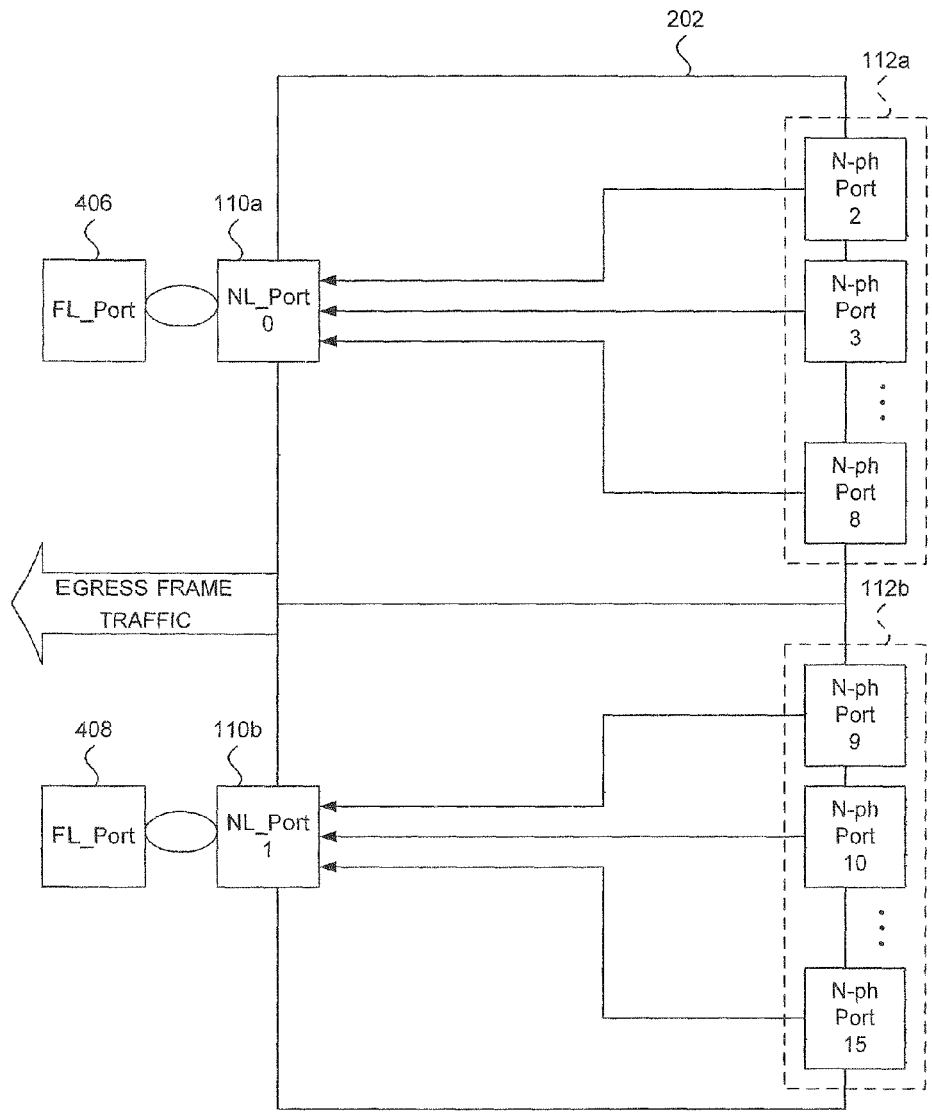
FIG. 7 is a schematic diagram that illustrates routing of egress frame traffic according to an embodiment of the invention.

As illustrated in FIG. 7, initiator ports 112a and 112b (N-ph PORTs) are configured to route all I/O frames to network ports 110a and 110b. When so configured, each N-ph_PORT acts as if it is directly connected to the external network or fabric. One example of this is during FLOGI processing. The FLOGI frames are routed to processor 106 for processing. The ALPA component of the requested address such as, for example, 0x0000[ALPA] is modified and the frames forwarded accordingly. Some FLOGI response fields, such as BBC/ED_TOV/RA_TOV are also modified in the FLOGI ACC frame. All ELS and Fabric service frames are sent to management agent 302.

As noted above, portions of the present invention can be implemented using commercially available hardware. When network switch 102 is implemented, for example, using Broadcom's BCM8440 chip, all the D_ID routing and ELS filtering can be in the BCM8440 chip. Link and ELS management for initiator ports 112 and network ports 110 can be performed by firmware and/or software running, for example, Linux code on a MIPS Processor.

In embodiments, management agent 302 is a firmware component responsible for processing port events and management frame traffic for initiator port 112 and network port 110. In one embodiment, management agent 302 operates such that network port 110 appears to external network devices as if it were a set of NL_PORT FCP_SCSI initiator devices. Management agent 302 also operates in a manner that gives each initiator device connected to initiator port 112 the idea that it is directly connected to an external network (e.g., to a fabric switch).

Figure 8:
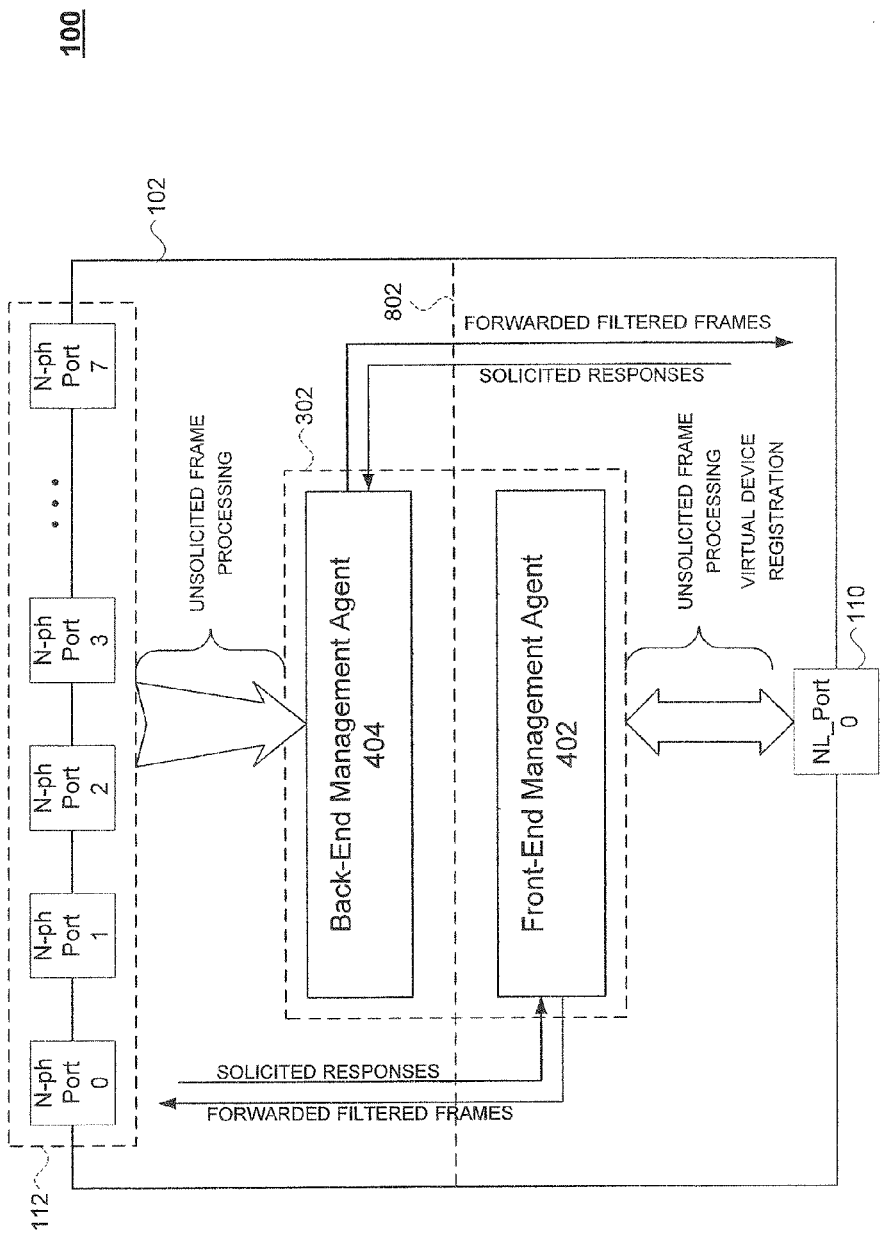
FIG. 8 is a schematic diagram that illustrates operation of a management agent and routing of frame traffic according to an embodiment of the invention.

FIG. 8 illustrates how one can think of apparatus 100 as having a dividing line 802 at the midsection of network switch 102, which separates network port 110 from initiator port 112.

As shown in FIG. 8, management frame processing is different for the different port types. Accordingly, management agent 302 can be thought of as including a front-end management agent 402 and a back-end management agent 404. Front-end management agent 402 performs operations relating to specific tasks associated with network port 110. Back-end management agent 404 performs operations relating to specific tasks associated with initiator port 112. These specific tasks include handling unsolicited management request frames from network port 110 and initiator port 112. Depending on processing logic, these frames may be filtered and forwarded, or the frames may be processed directly by the management agent and a management response returned.

In embodiments, management agent 302 is responsible for one or more of the following tasks:
 1. Forwarding non-disruptive (query/get) oriented management frames from initiator port 112 (i.e., the N-ph_PORTs) to network port 110;
 2. Re-mapping back-end N-ph_PORT NPID and WWPN parameter field values to fixed NPID and WWPN values in all management frames;
 3. Internally processing and replying to registration oriented management frames issued from initiator devices coupled to initiator port 112;
 4. Performing device registration for initiator devices coupled to network port 110; and
 5. Hiding back-end initiator port connection oriented events (port up/port down) from the external network 210 (e.g., the back-end ports should be considered I/O processing engines, and the addition or removal of these back-end ports should be isolated from the front-end port and the external network).

Front-end management agent 402 is responsible for management frame processing related to network port 110. For example, front-end management agent 402 processes port initialization and initiates device registration for network port 110. In embodiments, the scope of frame processing is the full required protocol coverage of ELS and Name Server frames mentioned in Fibre Channel-FLA 2.7.

In embodiments, front-end management agent 402 assigns a unique static WWPN/WWNN for each network port 110 (and each ALPA in NL_PORT mode). The WWPN remains fixed and static irregardless of the actual initiator devices connected to the back-end N-ph_PORTs. Front-end management agent 402 also is responsible for processing all unsolicited ELS and Fabric Service frames sent from a fabric.

In embodiments, front-end management agent 402 is responsible for processing one or more of the following:
 1. Network port Initialization;
 2. Device registration with a network controller (e.g., FLOGI);
 3. Device registration with Name Server (NS set operations);
 4. Rx RCSN forwarding and fan-out to back-end N-ph_PORTs (exchange cleanup handling);
 5. Rx generic ELS processing;
 6. Proxy agent probing;
 7. Rx unsolicited FCP-SCSI discovery command(s);
 8. SCSI Inquiries; and
 9. Vital product data page information.

Front-end management agent 402 performs port initialization for each front-end port, for example, in system 202. In an embodiment, the network port initializes using Fibre Channel-AL2 loop protocol in NL_PORT mode. The back-end ports (N-ph PORTS) associated with the front-end ports are affected by the port-up and port-down events occurring on the front-end network ports. When a front-end network port 110 goes down, it forces each associated N-ph_PORT into an offline state, for example, by sending NOS continuously to all associated N-ph PORTs.

When a network port 110 returns to proper operation, it completes name server and fabric logic services, and it allows associated N-ph ports to come on line. Back-end management agent 404 assigns port IDs to the N-ph_PORTs and sends accept responses to N-ph port registration requests. Initiators devices on the N-ph PORTs as part of the target discovery process send PLOGIs to target devices. Back-end management agent 404 processes the PLOGIs (modified WWNN and WWPN) and forwards them to each target.

Front-end management agent 402 sources fabric logic (FLOGI) requests for each ALPA exposed on a front end NL_PORT. A fixed WWPN/WWNN is used for these devices. The public address domain and areas components (e.g., DDAA[XX]) returned from the fabric assigned to the front-end port in the FLOGI accept frame is used for associated back-end ports. Back-end management agent 404 uses this internally recorded address identifier (DDAAXX) for back-end N-ph_PORT FLOGI response processing. Registration for state change notification(s) is performed for each ALPA exposed on an NL_PORT using SR protocol.

Front-end management agent 402 also sources NS registration frames for each front-end ALPA exposed on an NL_PORT. This includes registration of Fibre Channel-4 types RFT_ID, device port id RPN_ID (fixed WWPN value), device port name RNN_ID, device node name: RSNN_NN (fixed WWNN assigned value), and the symbolic port name RSPN_ID. Registration is performed for each NL_PORT exposed to the external network.

Front-end management agent 402 is responsible for receiving and processing unsolicited RSCN request frames from a fabric controller for each front-end NL_PORT. Front-end management agent 402 replicates registered state change notification (RSCN) events and forwards the appropriate data to associated back-end N-ph_PORTs.

Front-end management agent 402 receives and processing unsolicited ELS frames for FCP-SCSI initiator devices, for example, according to the Fibre Channel-FLA 2.7 standard. The frames/requests are directly processed and returned by front-end management agent 402. The responses return information defining a FCP-SCSI initiator, and no interaction with back-end management agent is required. In embodiments, front-end management agent 402 supports the following ELS frames as ELS Responder: ADISC, FAN, PLOGO, PDISC, PLOGI, PRLI, PRLO, RNC, RRQ, RSCN. In selected embodiments, the following ELS frames also are supported: ABTX, RES, RLS, RSI, RSS, SCN, SCR, TPRLO.

Many fabric switch devices have proxy discovery agents that probe edge devices in order to help populate the Name Server database. These devices can source ELS requests to network port 110. In embodiments, front-end management agent 402 satisfies requests for information from these devices about network port 110.

In an embodiment, front-end management agent 402 receives and processes unsolicited FCP-SCSI discovery commands. These requests also are processed and returned by front-end management agent 402, returning information defining a FCP-SCSI initiator, without interaction with back-end management agent 404. The following FCP-SCSI FCP commands are supported: Test Unit Ready, Inquiry-Standard, and Inquiry-Vital Product Data. The Vital Product Data page returns the WWPN/WWNN of network port 110.

Back-end management agent 404 is responsible for management frame processing related to the N-ph_PORTs (initiator port 112) connected to back-end FCP-initiator devices. Back-end management agent 404 processes port initializations and replies to device registration requests for the N-ph_PORTs. The internal behavior of back-end management agent 404 allows initiator devices to operate as if they were directly connected to the external network (e.g., Fabric Switch) coupled to network port 110. In N_PORT mode, each initiator device coupled to an N-ph_PORT can operate as if it were the only device coupled to network port 110. This is accomplished by specialized forwarding and filtering of ELS and Fabric Services frames, as illustrated in FIG. 8. Fabric controller and name server registration is isolated and hidden from the external network/connected fabric. General WWPN re-mapping to a fixed WWPN (related to network port 110) occurs for ELS and Fabric Service frames sourced by back-end ports.

In embodiments, back-end management agent 404 is responsible for processing/performing one or more of the following:

1. Port Initialization (N-ph_PORTs);
2. Unsolicited ELS/Fabric Service frames required for FCP-SCSI initiators by Fibre Channel-FLA 2.7;
3. Fabric Control FLOGI frame requests;
4. Name Server registrations; and
5. Name Server queries.

In embodiments, back-end management agent 404 performs port initialization for each back-end N-ph PORT. The ports initialize using Fibre Channel-FS point-to-point protocol. The back-end N-ph PORTs are only allowed to become "active" ports after their associated front-end network port 110 has been initialized and achieved an active state. At this point, an N-ph PORT sends name server registration and fabric login requests to back-end management agent 404. Back-end management agent 404 assigns a port ID to the N-ph_PORT and sends accept responses to registration requests. An initiator device on the N-ph PORT then sends a PLOGI. Back-end management agent 404 filters the PLOGI WWNN/WWPN and forwards it. The back-end management agent 404 captures and processes the PLOGI ELS_ACC frame from the target and forwards it to the N-ph_PORT.

In embodiments of the invention, all ELS and Fabric Service unsolicited requests sourced from back-end ports are received and processed by back-end management agent 404. In general, both the unsolicited requests and solicited responses are NPID/WWPN/WWNN filtered as follows:

1. The unsolicited requests from N-ph_PORTs (which are forwarded to the fabric) have the N-ph_PORT initiators true NPID/WWPN/WWNN remapped to the associated network port 110 device NPID/WWPN/WWNN; and
2. The solicited response frames returned from the fabric have the network port 110 NPID/WWPN/WWNN remapped to the N-ph_PORT initiators actual NPID/WWPN/WWNN.

Specialized handling of specific ELS/Fabric Service unsolicited requests are described in more below.

Back-end management agent 404 is responsible for receiving and responding to all FLOGI frames generated by N-ph_ PORT devices. These requests are directly processed and returned by back-end management agent 404.

Internal checking/processing is performed on the FLOGI service parameters requested by each N-ph_PORT initiator device. The requested service parameters must be supported by the FLOGI service parameters negotiated by the associated frond-end network port device, and they are returned based on the negotiated front-end port service parameters.

The NPID assigned to the each back-end port is based on the domain and area (DDAA - - - ) address components assigned to the associated front-end network port. The ALPA/device component of the address ( - - - XX) maps to fixed ALPA addresses assigned to each back-end N-ph_PORT.

Returned link level negotiated values such as BBC, are processed based on the local link resources of the N-ph_PORT.

Back-end management agent 404 also processes Fabric Service Name Server Registrations sourced from back-end N-ph_PORTs. These registration requests are terminated and acknowledged directly by back-end management agent 404. They are not forwarded to the Fabric as it is an objective of the present invention to hide or to virtualize the actual back-end initiators. All unsolicited Name Service registrations requests (0xX2XX type match) are acknowledged without the requirement for establishing and maintaining a local database.

As illustrated in FIG. 8, in embodiments, back-end management agent 404 forwards Fabric Service Name Server Query/Get requests (0xX1XX type match) sourced from back-end N-ph_PORT. These registration requests are forwarded through the associated network port 110. The frames are filtered, and references to NPID or WWPN/WWNN are replaced as described above.

Frame filtering is performed on unsolicited requests forwarded to the external network/fabric such that N-ph_PORT id/name data are changed to the appropriate network port 110 id/name data. Frame filtering is performed on the solicited responses returned from the external network/fabric such that network port 110 id/name data are changed to the appropriate N-ph_PORT id/name data. These query operations are non-disruptive to the external network/fabric, and hence the forwarded protocol has no or minimal impact on external network/Fabric state or I/O data paths.

In NL_PORT mode, RSCN frames are directly forwarded to the back-end N-ph_PORTs.

CONCLUSION

Example embodiments of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:
1. An apparatus comprising:
a switch including
a network port configured to be coupled to an external network, and
an initiator port configured to be coupled to an initiator device; and
a management agent including
a front end coupled to the network port, wherein the front end is configured to assign an address to the network port, and
a back end coupled to the initiator port, wherein the back end is configured to:
internally process a registration request from the initiator device, wherein internally processing the registration request comprises:
receiving the registration request, and
responding to the registration request and creating a mapping between the initiator device and the network port using the address,
forward a query from the initiator device to the external network using the mapping, and
process a solicited response from the external network.
2. The apparatus of claim 1, wherein the address assigned to the network port maps the network port to a plurality of initiator ports.
3. The apparatus of claim 1, wherein the initiator device operates as if the processing initiator device were coupled directly to the external network.

4. The apparatus of claim 1, wherein the front-end is configured to process one or more of:
network port initialization;
device registration with a network controller;
device registration with a name server;
exchange cleanup handling;
unsolicited ELS and fabric service frames sent from a fabric;
proxy agent probing;
unsolicited FCP-SCSI discovery commands;
SCSI inquiries; and
product data page information.
5. The apparatus of claim 1, wherein the back-end is configured to process one or more of:
initiator port initialization;
unsolicited ELS/fabric service frames required for FCP-SCSI initiators;
fabric control frame requests;
name server registrations; and
name server queries.
6. The apparatus of claim 1, wherein the back end is configured to internally process the registration request without forwarding the registration request to the external network.
7. The apparatus of claim 1, wherein the management agent is configured to operate in a point to point mode and a loop mode.
8. The apparatus of claim 1, wherein the address assigned by the front end is different than a second address presented by the network port to the front end.
9. The apparatus of claim 1, wherein the management agent is configured to mitigate, by internally processing the registration request, a potential disruption to the external network initiated by a configuration change caused by a coupling of the initiator device to the initiator port.
10. A blade server comprising:
a switch including
a network port configured to be coupled to an external network, and
a plurality of initiator ports configured to be coupled to a plurality of initiator devices; and
a management agent including
a front end coupled to the network port, wherein the front end is configured to assign an address to the network port, and
a back end coupled to the initiator ports, wherein the back end is configured to:
internally process registration requests from the initiator devices, wherein internally processing the registration request comprises:
receiving the registration requests, and
responding to the registration requests and creating a mapping between the plurality of initiator devices and the network port using the address,
forward a query from an initiator device in the plurality of initiator devices to the external network using the mapping, and
process a solicited response from the external network.
11. The blade server of claim 10, wherein the front end is further configured internally processing an unsolicited frame sent from the external network.
12. The blade server of claim 10, wherein the initiator ports initialize using a Fibre Channel point-to-point protocol.
13. The blade server of claim 10, wherein the management agent is configured to activate the initiator ports after the network port is initialized.

14. The blade server of claim 10, wherein the back end is further configured to:
  route an unsolicited request from a requesting initiator port to the network port;
  receive a solicited response from the network port; and
  route the solicited response to the requesting initiator port.

15. The blade server of claim 10, wherein the front end is further configured to
  route an unsolicited request from a network port to a target initiator port;
  receive a solicited response from the target initiator port; and
  route the solicited response to the network port.

16. The blade server of claim 10, wherein the external network is a Fibre Channel network, and wherein an operation of the network port is defined by the Fibre Channel standards.

17. The blade server of claim 10, wherein the management agent is configured to process frames such that each initiator port appears to each initiator device as a Fibre Channel F_PORT.

18. The blade server of claim 10, wherein the management agent is configured to process frames such that the network port appears to the initiator devices as a Fibre Channel NL_PORT.

19. An apparatus comprising:
  a switch including
    a network port configured to be coupled to an external network, and
    an initiator port configured to be coupled to an initiator device; and
  a management agent including
    a front end coupled to the network port, wherein the front end is configured to:
      perform port initialization for the network port,
      assign an address to the network port, wherein the address assigned by the front end is different than a second address presented by the network port to the front end,
      internally process an unsolicited frame from the external network by:
        receiving the unsolicited frame from the external network,
        responding, using the address, to the unsolicited frame, and
    a back end coupled to the initiator port, wherein the back end is configured to:
      internally process a registration request from the initiator device by:
        receiving the registration request, and
        responding to the registration request and creating a mapping between the initiator device and the network port using the address,
      forward a query from the initiator device to the external network using the mapping, and
      process solicited responses from the external network.

20. The apparatus of claim 19, wherein the front end is further configured to:
  receive a Registered State Change Notification (RSCN) frame sent from the external network;
  replicate a state change notification event associated with the RSCN frame; and
  forward data associated with the replicated state change notification event to the initiator port.

21. The apparatus of claim 19, wherein the front end is further configured to respond to an unsolicited discovery command, received from the external network, with information defining the initiator device without interacting with the back end.

* * * * *